United States Patent
Nagata (10) Patent No.: US 11,604,100 B2
(45) Date of Patent: Mar. 14, 2023

(54) TEMPERATURE SENSOR MODULE

(71) Applicant: Mitsubishi Electric Corporation, Tokyo (JP)

(72) Inventor: Hideo Nagata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 334 days.

(21) Appl. No.: 17/026,425

(22) Filed: Sep. 21, 2020

(65) Prior Publication Data

US 2021/0247241 A1 Aug. 12, 2021

(30) Foreign Application Priority Data

Feb. 6, 2020 (JP) .............................. JP2020-018629

(51) Int. Cl.
| | | |
|---|---|---|
| *G01K 7/18* | (2006.01) | |
| *G01K 1/022* | (2021.01) | |
| *G01K 7/22* | (2006.01) | |

(52) U.S. Cl.
CPC ............... *G01K 7/18* (2013.01); *G01K 1/022* (2013.01); *G01K 7/22* (2013.01); *G01K 2219/00* (2013.01)

(58) Field of Classification Search
CPC ............ G01K 7/18; G01K 1/022; G01K 7/22; G01K 2219/00; G01K 7/20; G01K 7/28
See application file for complete search history.

(56) References Cited

U.S. PATENT DOCUMENTS

| | | | | | |
|---|---|---|---|---|---|
| 3,371,318 | A | * | 2/1968 | Claiborne | G05B 19/14 700/133 |
| 4,335,605 | A | * | 6/1982 | Boyd | G01F 1/6986 702/45 |
| 7,768,292 | B1 | * | 8/2010 | Koch | G01R 31/40 324/764.01 |
| 7,960,951 | B2 | * | 6/2011 | Southwell | H02M 3/1584 323/283 |

(Continued)

FOREIGN PATENT DOCUMENTS

JP 2014-102218 A 6/2014

*Primary Examiner* — Tung S Lau
(74) *Attorney, Agent, or Firm* — Sughrue Mion, PLLC; Richard C. Turner (57) ABSTRACT

The temperature sensor module includes: a temperature sensor element and a signal processing circuit. The signal processing circuit includes: a series-connection resistor which is connected in series to the temperature sensor element; a temperature detection circuit which detects a temperature; a first analog-digital conversion circuit which converts an output signal from the temperature detection circuit into a digital signal; a memory which stores a series-connection resistor data piece about a relationship between a temperature and the resistance value of the series-connection resistor; a digital signal processing circuit which uses the series-connection resistor data piece, to calculate, on the basis of the digital signal indicating the temperature of the signal processing circuit, a digital command signal for keeping the resistance value of the series-connection resistor at a constant value, and outputs the digital command signal; and a digital-analog conversion circuit which outputs the digital command signal to the series-connection resistor.

9 Claims, 7 Drawing Sheets

(56) References Cited

U.S. PATENT DOCUMENTS

| | | | | |
|---|---|---|---|---|
| 9,024,606 B2* | 5/2015 | Adell | .................. | H02M 3/1588 |
| | | | | 323/283 |
| 10,551,417 B2* | 2/2020 | Novak | ............... | G01R 19/0092 |
| 2005/0190517 A1* | 9/2005 | Schweigert | ............. | H02M 1/32 |
| | | | | 361/93.1 |
| 2016/0003686 A1 | 1/2016 | Matsumoto et al. | | |

* cited by examiner

TEMPERATURE SENSOR MODULE

BACKGROUND OF THE INVENTION

1. Field of the Invention

The present disclosure relates to a temperature sensor module.

2. Description of the Background Art

Resistance thermometers having characteristics that the resistance values thereof change according to a temperature, are used as temperature sensor elements. As resistance thermometers, for example, platinum resistors and NTC thermistors are used. Examples of methods for detecting a temperature by using a resistance thermometer include a method in which a resistance thermometer and another resistance element are connected in series, a predetermined supply voltage is applied to both ends thereof, and an output voltage corresponding to a change in a temperature is obtained from a connection point between the resistance thermometer and the resistance element.

In order to measure a temperature with high accuracy by using a resistance thermometer, the following measure has been taken: a measure of using a resistance element having a small tolerance and high accuracy, as a resistance element to be connected to the resistance thermometer; a measure of adding a circuit and linearizing an output voltage obtained from a connection point; or the like.

As an example in which the accuracy of temperature measurement using a resistance thermometer is made high, the following configuration is disclosed: a configuration in which a temperature sensor element and a resistance element in an integrated circuit are connected in series, a signal at a connection point therebetween is subjected to a correction process by using information about the resistance value of the resistance element stored in a memory in the integrated circuit, to correct variation in the resistance value of the resistance element, and bending of a characteristic due to the temperature sensor element is corrected through digital calculation by a correction process section (see, for example, Patent Document 1).

Patent Document 1: Japanese Laid-Open Patent Publication No. 2014-102218

In the above-described Patent Document 1, variation in the resistance value of the resistance element integrated with the integrated circuit and connected in series to the temperature sensor element can be corrected, and no reference resistor for correcting the resistance value of the resistance element needs to be provided. Thus, a temperature sensor in which the resistance element is integrated in the integrated circuit and which has a small size, can be provided. However, the resistance value not only of the temperature sensor element, but also of the resistance element connected in series thereto, changes according to the temperature. There may be a difference in temperature between the temperature sensor element and a signal processing circuit having the resistance element disposed therein, and if, for example, the temperature of the temperature sensor element has not changed but the temperature of the signal processing circuit has changed, the resistance value of the resistance element changes. As a result, an error due to the change in the resistance value of the resistance element is included in a voltage signal at the connection point between the temperature sensor element and the resistance element. Since the configuration disclosed in the above-described Patent Document 1 cannot correct the error, a problem arises in that highly-accurate temperature measurement cannot be realized.

In addition, the above-described Patent Document 1 proposes, as a method for compensating for the change in the temperature of the resistance element, a method in which the resistance element is configured with a combination of a resistor having a negative temperature coefficient and a resistor having a positive temperature coefficient. However, a problem arises in that, regarding the resistance value of the resistance element in the integrated circuit, variation in temperature coefficient and resistance value is generated in a process of manufacturing the signal processing circuit, and the yield of the signal processing circuit is not stabilized. In addition, although it is possible to improve the yield by means of laser trimming or the like for adjusting the resistance values of individual resistors, a problem arises in that the number of steps of the manufacturing increases and manufacturing cost increases.

SUMMARY OF THE INVENTION

In view of this, an object of the present disclosure is to obtain a temperature sensor module that realizes highly-accurate temperature measurement without increasing the number of steps of manufacturing.

A temperature sensor module according to the present disclosure is a temperature sensor module including: a temperature sensor element of which a resistance value changes according to a temperature of a measurement target medium; and a signal processing circuit which is connected to the temperature sensor element and which outputs an electrical signal correlating to the resistance value of the temperature sensor element. The signal processing circuit includes: a series-connection resistor which is connected in series to the temperature sensor element, and of which a resistance value changes according to a command signal having been transmitted; a temperature detection circuit which detects and outputs a temperature of the signal processing circuit; a first analog-digital conversion circuit which converts an output signal from the temperature detection circuit into a digital signal and outputs the digital signal; a memory which stores a series-connection resistor data piece about a relationship between a temperature and the resistance value of the series-connection resistor; a digital signal processing circuit which uses the series-connection resistor data piece stored in the memory, to calculate, on the basis of the digital signal indicating the temperature of the signal processing circuit, a digital command signal for keeping the resistance value of the series-connection resistor at a constant value, and outputs the digital command signal; and a digital-analog conversion circuit which converts the digital command signal into an analog command signal and outputs the analog command signal to the series-connection resistor.

With the temperature sensor module according to the present disclosure, since the resistance value of the resistance element is kept at a constant value inside the signal processing circuit, no error due to the resistance value of the resistance element is included in a voltage signal at a connection point between the temperature sensor element and the resistance element, whereby highly-accurate temperature measurement can be realized. In addition, since the resistance value of the resistance element is kept at a constant value inside the signal processing circuit, the yield of the signal processing circuit can be stabilized. In addition, the processing of keeping the resistance value of the resistance element at a constant value inside the signal processing circuit does not cause the number of steps to increase, whereby manufacturing cost can be reduced.

DETAILED DESCRIPTION OF THE PREFERRED EMBODIMENTS OF THE INVENTION

Hereinafter, a temperature sensor module according to an embodiment of the present disclosure will be described with reference to the drawings. In the drawings, identical or corresponding members and parts are denoted by the same reference characters in the description.

First Embodiment

Figure 1:
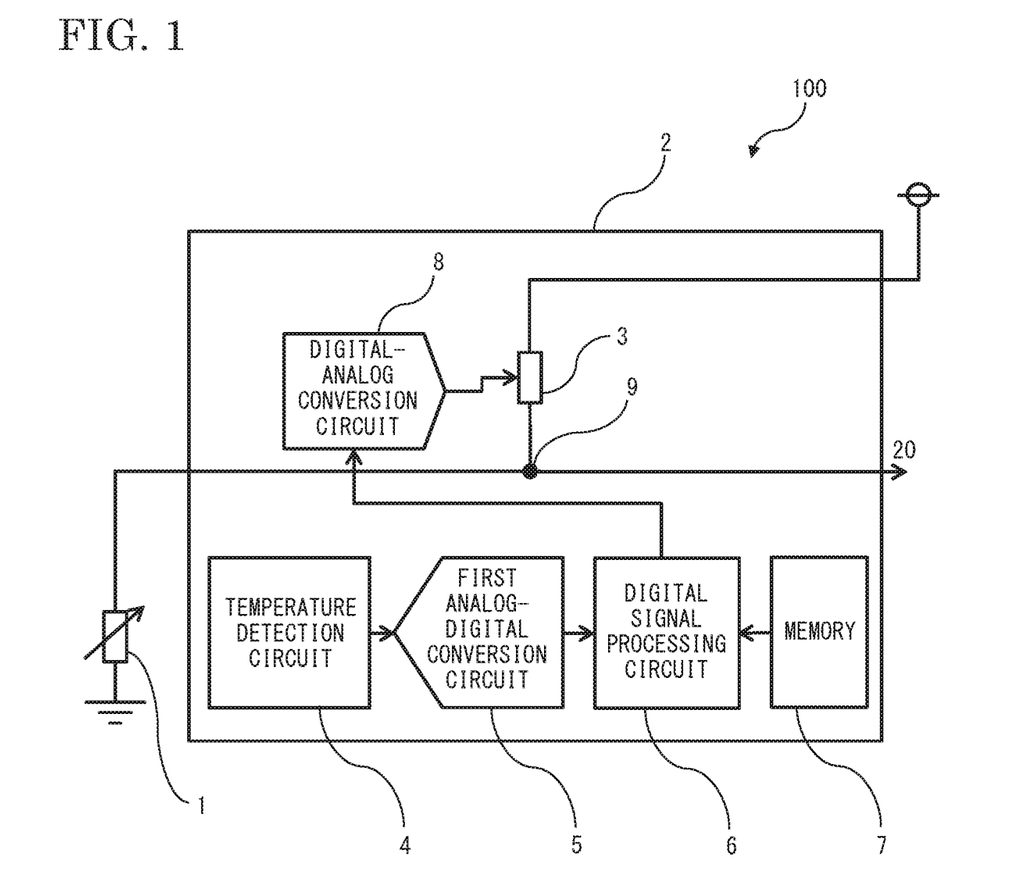
FIG. 1 is a schematic configuration diagram of a temperature sensor module according to a first embodiment.

FIG. 1 is a schematic configuration diagram of a temperature sensor module 100 according to a first embodiment. The temperature sensor module 100 is a module for detecting the temperature of a measurement target medium, and outputs an electrical signal corresponding to the temperature of the measurement target medium. The temperature sensor module 100 includes a temperature sensor element 1 and a signal processing circuit 2. Here, a resistance thermometer of which the resistance value changes according to the temperature of the measurement target medium is used as the temperature sensor element 1. A method for detecting the temperature by using the temperature sensor element 1 according to the present disclosure is a method in which the temperature sensor element 1 and a series-connection resistor 3 included in the signal processing circuit 2 are connected in series, a predetermined supply voltage is applied to both ends of the temperature sensor element 1 and the series-connection resistor 3, and an output voltage corresponding to a change in the temperature is obtained from a connection point 9 between the temperature sensor element 1 and the series-connection resistor 3, thereby detecting a temperature.

The temperature sensor element 1 is, for example, a platinum resistor or an NTC thermistor. The signal processing circuit 2 is connected to the temperature sensor element 1, and outputs an electrical signal correlating to the resistance value of the temperature sensor element 1. The signal processing circuit 2 is an integrated circuit obtained by integration through a semiconductor process. The signal processing circuit 2 includes the series-connection resistor 3 which is connected in series to the temperature sensor element 1, and of which the resistance value changes according to a command signal having been transmitted. The series-connection resistor 3 is a thick film resistor, a diffused resistor, or the like formed in the integrated circuit.

For the supply voltage applied to both ends of the temperature sensor element 1 and the series-connection resistor 3 connected in series, either of both ends may be on the high potential side. In FIG. 1, the end of the series-connection resistor 3 is on the high potential side, and the end of the temperature sensor element 1 is grounded. However, the end of the temperature sensor element 1 may be on the high potential side, and the end of the series-connection resistor 3 may be grounded. A signal of the output voltage obtained from the connection point 9 passes through an amplifier or a buffer circuit (neither of them are shown) included in the signal processing circuit 2, to be outputted to the outside of the signal processing circuit 2 as a temperature sensor signal 20 which is an analog signal. The signal of the output voltage may be caused to pass through an analog-digital conversion circuit, to be outputted to the outside of the signal processing circuit 2 as a temperature sensor signal 20 which is a digital signal. In addition, the analog-digital conversion circuit and a circuit which applies supply voltage to both ends of the temperature sensor element 1 and the series-connection resistor 3, may be provided outside the signal processing circuit 2. However, if these circuits are integrated with the signal processing circuit 2, the size of the temperature sensor module 100 can be made small.

The resistance value of the temperature sensor element 1 when the temperature of the temperature sensor element 1 is $T_A$ is defined as $R_A$, the resistance value of the series-connection resistor 3 is defined as $R_P$, and the supply voltage supplied to the temperature sensor element 1 and the series-connection resistor 3 is defined as $V_0$. If the end of the series-connection resistor 3 is connected to the high potential side for the supply voltage, an output voltage $V_A$ at the connection point 9 is expressed by using formula (1).

$$V_A = \frac{R_P}{R_A + R_P} \times V_0 \qquad (1)$$

Similarly, if the end of the temperature sensor element 1 is connected to the high potential side for the supply voltage, the voltage $V_A$ at the connection point 9 is expressed by using formula (2).

$$V_A = \frac{R_A}{R_A + R_P} \times V_0 \qquad (2)$$

The resistance value of the series-connection resistor 3 formed by a thick film resistor, a diffused resistor, or the like also changes according to the temperature. Regarding the temperature sensor element 1 and the series-connection resistor 3, even if the temperature sensor element 1 and the series-connection resistor 3 are disposed close to each other, there may be cases where a difference in temperature is generated between the temperature sensor element 1 and the series-connection resistor 3. The cases where the difference in temperature is generated include: a case where a difference in temperature is generated owing to self-heating that has occurred by driving the circuits integrated in the signal processing circuit 2; a case where a difference in temperature is generated between the temperature sensor element 1 and the series-connection resistor 3 owing to a thermal resistance between the temperature sensor element 1 and the signal processing circuit 2; and the like. If a structure in which only the temperature sensor element 1 is exposed to the measurement target medium is employed to improve the accuracy of a detected temperature or improve responsiveness, there may also be a case where a difference in temperature is generated between the temperature sensor element 1 and the signal processing circuit 2. Regarding the case where a difference in temperature is generated between the temperature sensor element 1 and the series-connection resistor 3, if, for example, the temperature of the temperature sensor element 1 has not changed but the temperature of the series-connection resistor 3 has changed, only the resistance value of the series-connection resistor 3 changes. As a result, an error due to the change in resistance value of the series-connection resistor 3 is included in the output voltage $V_A$ at the connection point 9 between the temperature sensor element 1 and the series-connection resistor 3, and the output voltage $V_A$ changes.

Figure 2:
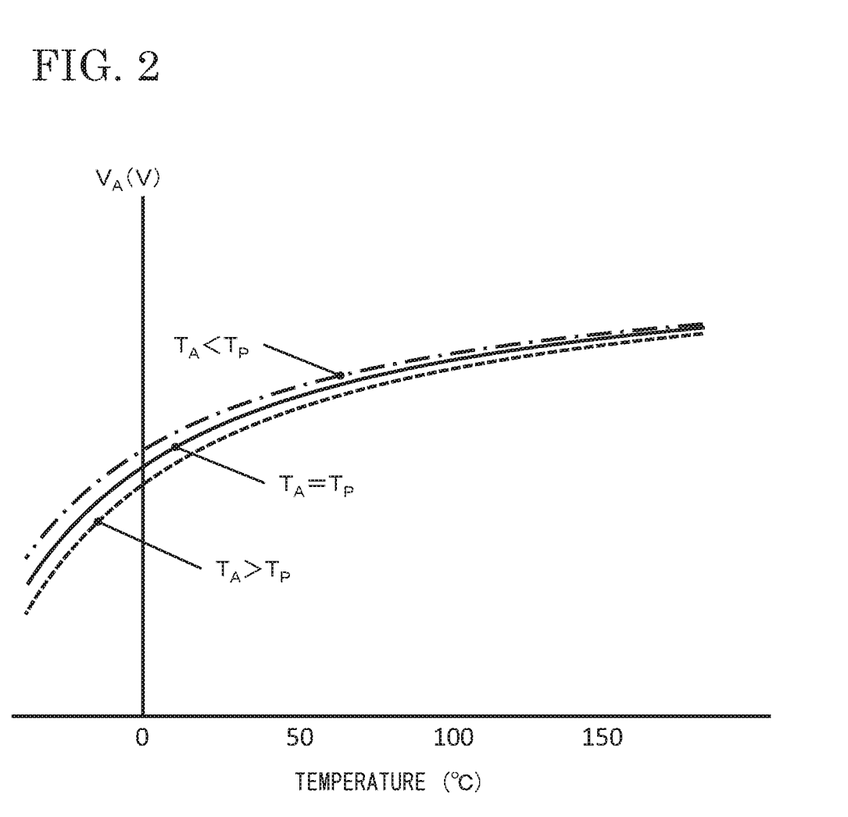
FIG. 2 is a diagram indicating a change in an output voltage $V_A$ when there is a difference in temperature between a temperature sensor element and a series-connection resistor, with a platinum resistor being used as the temperature sensor element.
Figure 3:
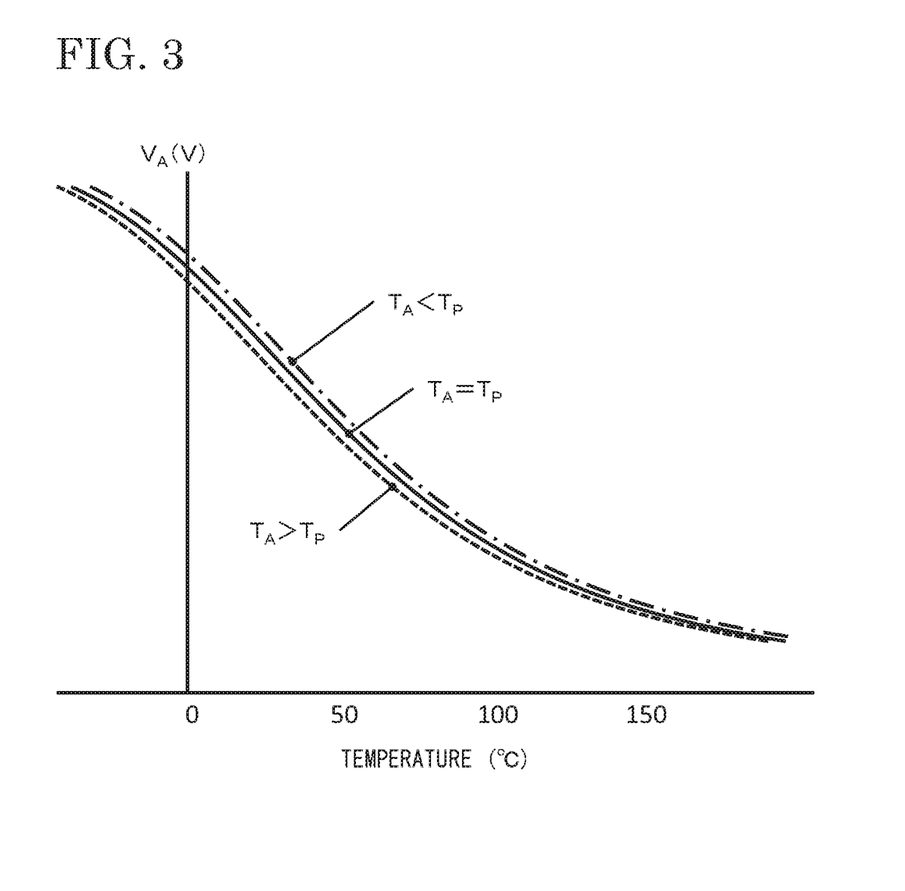
FIG. 3 is a diagram indicating a change in the output voltage $V_A$ when there is a difference in temperature between the temperature sensor element and the series-connection resistor, with an NTC thermistor being used as the temperature sensor element.

FIG. 2 and FIG. 3 each indicate an example of the manner in which the output voltage $V_A$ changes when a temperature $T_P$ and the temperature $T_A$ of the temperature sensor element 1 are different from each other, where $T_P$ is the temperature of the series-connection resistor 3. FIG. 2 is a diagram indicating a change in the output voltage $V_A$ when there is a difference in temperature between the temperature sensor element 1 and the series-connection resistor 3, with a platinum resistor being used as the temperature sensor element 1. FIG. 3 is a diagram indicating said change, with an NTC thermistor being used as the temperature sensor element 1. When a difference is generated between the temperature $T_A$ and the temperature $T_P$, the output voltage $V_A$ changes as follows. In the case where the temperature sensor element 1 is a resistance thermometer such as a platinum resistor of which the resistance value changes substantially linearly relative to the temperature, the output voltage $V_A$ changes as shown in FIG. 2. Meanwhile, in the case where the temperature sensor element 1 is a resistance thermometer such as an NTC thermistor of which the resistance value changes nonlinearly relative to the temperature, the output voltage $V_A$ changes as shown in FIG. 3. Therefore, in order to realize highly-accurate temperature measurement, the resistance value of the series-connection resistor 3 has to be kept at a constant value regardless of the temperature, thereby suppressing change in the output voltage $V_A$ due to change in the resistance value of the series-connection resistor 3.

<Circuit Configuration>

The internal circuit configuration of the signal processing circuit 2 which is a major part of the present disclosure and which keeps the resistance value of the series-connection resistor 3 at a constant value, will be described. As shown in FIG. 1, the signal processing circuit 2 includes a temperature detection circuit 4, a first analog-digital conversion circuit 5, a digital signal processing circuit 6, a memory 7, and a digital-analog conversion circuit 8. The temperature detection circuit 4 detects a temperature of the signal processing circuit 2 and outputs the temperature to the first analog-digital conversion circuit 5. If the signal processing circuit 2 is an integrated circuit made of silicon, a silicon diode is provided as a semiconductor temperature sensor to the temperature detection circuit 4. The first analog-digital conversion circuit 5 converts the output signal from the temperature detection circuit 4 into a digital signal and outputs the digital signal to the digital signal processing circuit 6.

The memory 7 stores a series-connection resistor data piece about the relationship between the temperature and the resistance value of the series-connection resistor 3. The series-connection resistor data piece refers to a reference temperature, a reference resistance value of the series-connection resistor 3 which is a resistance value of the series-connection resistor 3 at the reference temperature, and a slope of a change in the resistance value of the series-connection resistor 3 relative to the temperature of the series-connection resistor 3. The digital signal processing circuit 6 uses the series-connection resistor data piece stored in the memory 7, to calculate a resistance value of the series-connection resistor 3 on the basis of the digital signal indicating the temperature of the signal processing circuit 2. The digital signal processing circuit 6 calculates, on the basis of the calculated resistance value, a digital command signal for keeping the resistance value of the series-connection resistor 3 at a predetermined constant value, and outputs the digital command signal. The digital-analog conversion circuit 8 converts the digital command signal into an analog command signal and outputs the analog command signal to the series-connection resistor 3. The resistance value of the series-connection resistor 3 changes according to the transmitted analog command signal, whereby the resistance value of the series-connection resistor 3 is kept at the predetermined constant value.

In this configuration, the resistance value of the series-connection resistor 3 can be kept at a constant value. Therefore, no error due to temperature-dependent change in the resistance value of the series-connection resistor 3 is superimposed on the output voltage obtained from the connection point 9 between the temperature sensor element 1 and the series-connection resistor 3, and the output voltage correlates only to the temperature of the temperature sensor element 1. Accordingly, the temperature sensor module 100 can measure the temperature of the measurement target medium with high accuracy.

<Digital-Analog Conversion Circuit 8 and Series-Connection Resistor 3>

Figure 4:
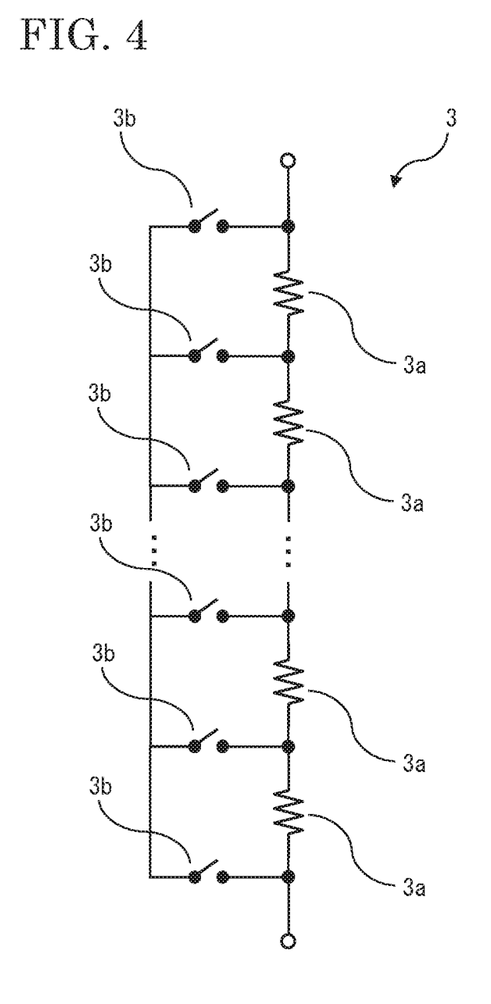
FIG. 4 is a diagram indicating an example of the configuration of the series-connection resistor.

Configurations of the digital-analog conversion circuit 8 and the series-connection resistor 3 for keeping the resistance value of the series-connection resistor 3 at a constant value, will be described. The digital-analog conversion circuit 8 and the series-connection resistor 3 constitute, for example, a digital potentiometer included in the signal processing circuit 2. An example of the series-connection resistor 3 configured in the digital potentiometer is shown in FIG. 4. The series-connection resistor 3 includes a plurality of resistance elements 3*a* connected in series, and a plurality of switch elements 3*b* which establish or break direct connection between both ends of each of the plurality of resistance elements 3*a*. The plurality of switch elements 3*b* are individually turned on or off by the command signal having been transmitted. The resistance value of the series-connection resistor 3 changes by switching the switches on or off. On the basis of the digital command signal from the digital signal processing circuit 6, control of ON or OFF of the switches is performed so as to cancel the change, in the resistance, that occurs according to the temperature, whereby the resistance value of the series-connection resistor 3 can be easily kept at a constant value. The series-connection resistor 3 is not limited in configuration to that shown in FIG. 4, and may be a variable resistor such as a ladder circuit. The digital-analog conversion circuit 8 and the series-connection resistor 3 may be configured with a combination of a fixed resistor and a digital potentiometer, or a combination of a plurality of digital potentiometers.

<Memory 7>

As the memory 7, a nonvolatile ROM (Read Only Memory) is used. If a mask ROM is used as the memory 7, content stored in the mask ROM cannot be rewritten after the mask ROM is manufactured. Therefore, a series-connection resistor data piece about a standard center value for the series-connection resistors 3 is stored in the memory 7 in a process of manufacturing the signal processing circuit 2. If mask ROMs are used, series-connection resistor data pieces corresponding to variations of respective series-connection resistors 3 cannot be stored in the memories 7.

If programmable ROMs are used as memories 7, data pieces can be individually written in the programmable ROMs included in individual signal processing circuits 2, after the signal processing circuits 2 are manufactured. After the resistance values of the individual series-connection resistors 3 at a certain temperature are measured, the obtained series-connection resistor data pieces can be written in the memories 7. Therefore, the series-connection resistor data pieces corresponding to variations of the respective series-connection resistors 3 are written in the memories 7. A specific procedure for acquiring data pieces is as follows, for example. The resistance value of each series-connection resistor 3 when the temperature of the corresponding signal processing circuit 2 is set to a predetermined temperature $T_1$ is measured, and the measured resistance value is defined as $R_1$. Next, the resistance value of the series-connection resistor 3 when the temperature of the signal processing circuit 2 is set to a temperature $T_2$ different from $T_1$ is measured, and the measured resistance value is defined as $R_2$. From these measurement results, a slope $\beta$ of a change in the resistance value of the series-connection resistor 3 relative to the temperature of the series-connection resistor 3 is calculated. The reference temperature $T_1$, the reference resistance value $R_1$ of the series-connection resistor 3, and the slope $\beta$ of the change in the resistance value of the series-connection resistor 3 are written in the corresponding memory 7 as a series-connection resistor data piece. Accordingly, the memories 7 store series-connection resistor data pieces about the individual series-connection resistors 3.

Even in a state where the temperature sensor element 1 and the signal processing circuit 2 are not connected to each other, the resistance value of the series-connection resistor 3 at a certain temperature can be measured. Therefore, the resistance value of the series-connection resistor 3 can be measured in a form in which the heat capacity is smaller than that of the temperature sensor module 100, such as a wafer form with a plurality of the signal processing circuits 2 or a submodule form in which the temperature sensor element 1 has not yet been connected. Since the heat capacity is small, it is possible to shorten the time required for stabilizing the temperature of the signal processing circuit 2 at the time of measurement.

If programmable ROMs are used as memories 7, series-connection resistor data pieces corresponding to variations of respective series-connection resistors 3 can be stored in the memories 7. Therefore, the resistance value of each series-connection resistor 3 can be kept at a constant value with high accuracy. Accordingly, the temperature sensor module 100 can measure the temperature of the measurement target medium with higher accuracy.

A specific usage example of the temperature sensor module 100 will be described. The temperature sensor module 100 is suitable for measuring the temperatures of measurement target mediums such as intake air and exhaust gas of an engine of an automobile. The flow rate of the intake air or exhaust gas changes according to the rotation rate of the engine. In control of the engine of the automobile, the temperature sensor module 100 is required to have quick temperature responsiveness. Therefore, the temperature sensor module 100 is mounted so as to project to the center of a flow tube for intake air or exhaust gas. Furthermore, in order to reduce pressure loss of air flowing in the flow tube due to the temperature sensor module 100 projecting in this manner, the signal processing circuit 2 is disposed on the outer side of the flow tube so as to be apart from the temperature sensor element 1 so that the volume of the temperature sensor module 100 projecting into the flow tube is made as small as possible. In addition, in order to cause the temperature of the temperature sensor element 1 to approach the temperature of intake air or exhaust gas, a connection portion between the temperature sensor element 1 and the signal processing circuit 2 has a thin and long structure such that heat conduction from the temperature sensor element 1 to the signal processing circuit 2 is made as low as possible. Therefore, the temperature sensor element 1 and the signal processing circuit 2 are thermally isolated from each other, and the temperature of the temperature sensor element 1 and the temperature of the signal processing circuit 2 do not match each other depending on the operation state of the vehicle. Even if the temperature of the temperature sensor element 1 and the temperature of the signal processing circuit 2 do not match each other, the above-described configuration allows the resistance value of the series-connection resistor 3 to be kept at a constant value. Accordingly, the temperature sensor module 100 can measure the temperature of the measurement target medium with high accuracy. The configuration of the present disclosure is effective in such usage.

As described above, in the temperature sensor module 100 according to the first embodiment, the resistance value of the series-connection resistor 3 is kept at a constant value inside the signal processing circuit 2, and the output voltage obtained from the connection point 9 between the temperature sensor element 1 and the series-connection resistor 3 correlates only to the temperature of the temperature sensor element 1. Accordingly, the temperature sensor module 100 can measure the temperature of the measurement target medium with high accuracy. In addition, since the series-connection resistor 3 and the circuits for keeping the resistance value of the series-connection resistor 3 at a constant value is integrated with the signal processing circuit 2, the size of the temperature sensor module 100 can be made small. In addition, since the series-connection resistor 3 includes the plurality of resistance elements connected in series and the plurality of switch elements which establish or break direct connection between both ends of each of the plurality of resistance elements, the resistance value of the series-connection resistor 3 can be easily kept at a constant value. In addition, if programmable ROMs are used as memories 7, individual series-connection resistor data pieces corresponding to variations of respective series-connection resistors 3 can be stored in the programmable ROMs. Thus, the resistance value of each series-connection resistor 3 can be kept at a constant value with high accuracy. Accordingly, the temperature sensor module 100 can measure the temperature of the measurement target medium with higher accuracy. In addition, since the resistance value of the series-connection resistor 3 is kept at a constant value inside the signal processing circuit 2, the yield of the signal processing circuit 2 can be stabilized. In addition, the processing of keeping the resistance value of the series-connection resistor 3 at a constant value inside the signal processing circuit 2 does not cause the number of steps of the manufacturing of the temperature sensor module 100 to increase, whereby manufacturing cost can be reduced.

Second Embodiment

Figure 5:
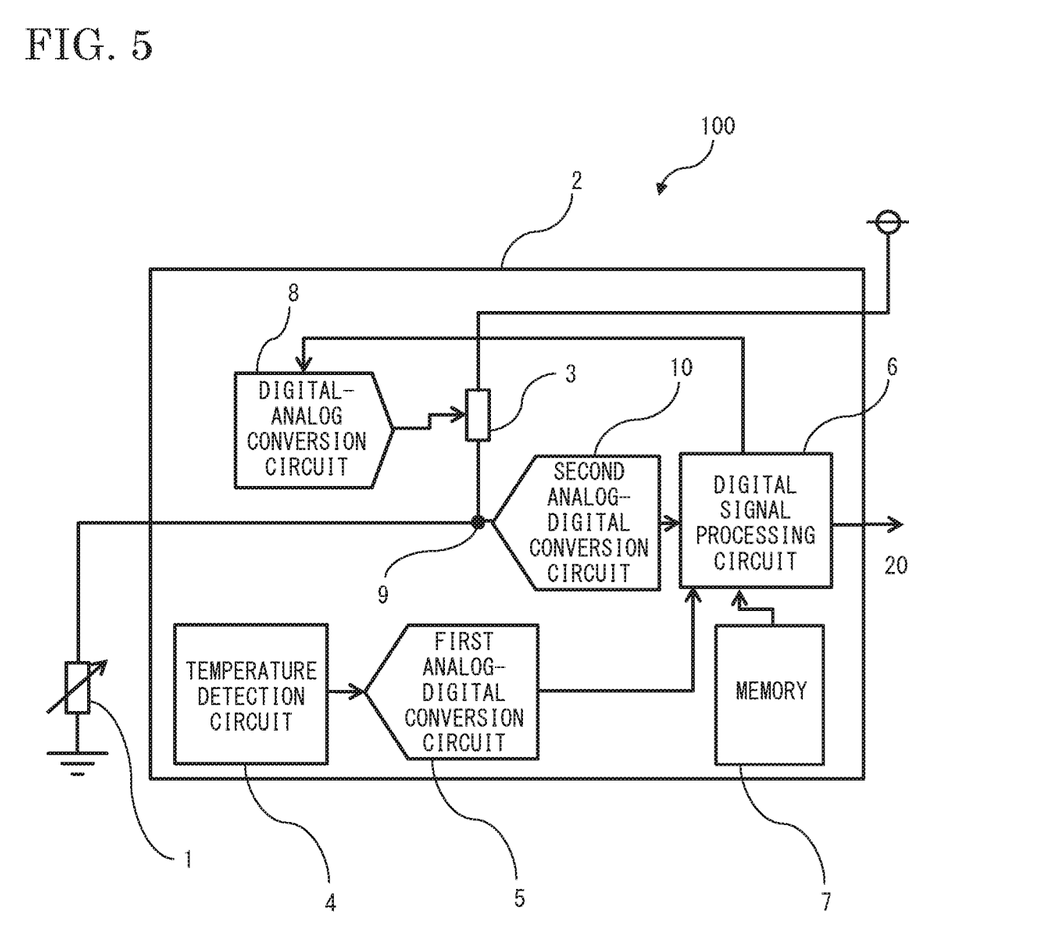
FIG. 5 is a schematic configuration diagram of a temperature sensor module according to a second embodiment.

A temperature sensor module 100 according to a second embodiment will be described. FIG. 5 is a schematic configuration diagram of the temperature sensor module 100 according to the second embodiment. In the temperature sensor module 100 according to the second embodiment, the signal processing circuit 2 includes a second analog-digital conversion circuit 10.

The signal processing circuit 2 includes the second analog-digital conversion circuit 10 in addition to the components described in the first embodiment. The second analog-digital conversion circuit 10 converts, into a digital voltage signal, a voltage signal at the connection point 9 between the temperature sensor element 1 and the series-connection resistor 3, and outputs the digital voltage signal to the digital signal processing circuit 6. The memory 7 stores a temperature sensor element data piece about the relationship between the resistance value of the temperature sensor element 1 and the temperature of the temperature sensor element 1. The temperature sensor element data piece refers to a reference temperature, a reference resistance value which is a resistance value of the temperature sensor element 1 at the reference temperature, and a slope of a change in the resistance value of the temperature sensor element 1 relative to the temperature of the temperature sensor element 1. The digital signal processing circuit 6 uses the temperature sensor element data piece stored in the memory 7, to calculate the temperature of the temperature sensor element 1 on the basis of the digital voltage signal, and outputs a temperature sensor signal 20 as an electrical signal. The outputted electrical signal may be further outputted as an analog signal via a digital-analog conversion circuit (not shown). Alternatively, the outputted electrical signal may be outputted as a digital signal via a digital signal interface circuit of a PWM (Pulse Width Modulation) type, a SENT (Single Edge Nibble Transmission) type, or the like.

<Platinum Resistor>

A case where the temperature sensor element 1 is a platinum resistor, will be described. The memory 7 stores, as the temperature sensor element data piece, a reference temperature, a reference resistance value which is a resistance value of the platinum resistor at the reference temperature, and a slope of a change in the resistance value of the platinum resistor relative to the temperature of the platinum resistor. Here, if the reference temperature is defined as $T_0$, the reference resistance value is defined as $R_0$, the slope is defined as $\alpha$, the resistance value of the series-connection resistor 3 is defined as $R_P$, the supply voltage supplied to the series-connection resistor 3 and the platinum resistor is defined as $V_0$, the voltage at the connection point 9 between the series-connection resistor 3 and the platinum resistor is defined as $V_A$, and the resistance value of the platinum resistor at a certain temperature $T_A$ is defined as $R_A$, the resistance value $R_A$ is expressed by using formula (3).

[Mathematical 3]

$$R_A = \alpha(T_A - T_0) + R_0 \quad (3)$$

If the end of the series-connection resistor 3 is connected to the high potential side for the supply voltage, the voltage $V_A$ is expressed by using formula (4).

$$V_A = \frac{R_P}{\{\alpha \times (T_A - T_0) + R_0\} + R_P} \times V_0 \quad (4)$$

From formula (4), the certain temperature $T_A$ detected by the platinum resistor is expressed by using formula (5).

$$T_A = T_0 + \frac{1}{\alpha} \times \left( \frac{V_0 - V_A}{V_A} \times R_P - R_0 \right) \quad (5)$$

Similarly, if the end of the platinum resistor is connected to the high potential side for the supply voltage, the voltage $V_A$ is expressed by using formula (6).

$$V_A = \frac{\alpha \times (T_A - T_0) + R_0}{\{\alpha \times (T_A - T_0) + R_0\} + R_P} \times V_0 \quad (6)$$

From formula (6), the certain temperature $T_A$ detected by the platinum resistor is expressed by using formula (7).

$$T_A = T_0 + \frac{1}{\alpha} \times \left( \frac{V_A}{V_0 - V_A} \times R_P - R_0 \right) \quad (7)$$

Using formula (5) or formula (7), the temperature of the platinum resistor is calculated in the digital signal processing circuit 6 on the basis of: the reference temperature $T_0$, the reference resistance value $R_0$, and the slope $\alpha$ which are stored in the memory 7; the preset resistance value $R_P$ of the series-connection resistor; the preset supply voltage $V_0$; and the voltage $V_A$ which is a digital voltage signal.

Although the case where the temperature sensor element 1 is the platinum resistor has been described, the metal used as the temperature sensor element 1 is not limited to platinum, and the temperature sensor element 1 may be a resistance thermometer made of another metal such as nickel or copper. Regarding a characteristic of change in the resistance relative to the temperature of the resistor made of a metal such as nickel or copper, the change has high nonlinearity as compared to the case of the platinum resistor. Therefore, the nonlinearity is preferably corrected in order to increase the accuracy of conversion of a resistance value into temperature information. In the example of the platinum resistor, one value of each of the reference temperature $T_0$, the reference resistance value $R_0$, and the slope $\alpha$ in the entire range of the voltage $V_A$ is stored in the memory 7. In the case of the resistance thermometer with high nonlinearity, the range of the voltage $V_A$ is divided into several segments, values of the reference temperature $T_0$, the reference resistance value $R_0$, and the slope $\alpha$ in each segment are stored in the memory 7, and the temperature of the resistor is calculated for each segment, whereby the nonlinearity can be corrected.

In this configuration, the reference temperature of the resistance thermometer used as the temperature sensor element 1, the reference resistance value which is the resistance value of the resistance thermometer at the reference temperature, and the slope of the change in the resistance value of the resistance thermometer relative to the temperature of the resistance thermometer are stored in the memory 7 as the temperature sensor element data piece. Thus, the temperature of the resistance thermometer can be calculated by using the temperature sensor element data piece. Therefore, even if resistance thermometers having various characteristics are used, the temperature sensor module 100 can measure the temperature of the measurement target medium with high accuracy. In addition, if a platinum resistor which is a resistance thermometer with low nonlinearity is used as the temperature sensor element 1, one value of each of the reference temperature $T_0$, the reference resistance value $R_0$, and the slope α in the entire range of the voltage at the connection point 9 is stored in the memory 7, and thus the capacity of the memory 7 can be reduced.

<NTC Thermistor>

A case where the temperature sensor element 1 is an NTC thermistor, will be described. The NTC thermistor has a characteristic that the resistance thereof logarithmically changes relative to a temperature. The memory 7 stores, as the temperature sensor element data piece, a reference temperature, a reference resistance value which is a resistance value of the NTC thermistor at the reference temperature, and a slope of a change in the resistance value of the NTC thermistor relative to the temperature of the NTC thermistor. Here, if the reference temperature is defined as $T_0$, the reference resistance value is defined as $R_0$, the slope is defined as B, the resistance value of the series-connection resistor 3 is defined as $R_P$, the supply voltage supplied to the series-connection resistor 3 and the NTC thermistor is defined as $V_0$, the voltage at the connection point 9 between the series-connection resistor 3 and the NTC thermistor is defined as $V_B$, and the resistance value of the NTC thermistor at a certain temperature $T_B$ is defined as $R_B$, the resistance value $R_B$ is expressed by using formula (8).

$$R_B = R_0 \times \exp\left\{B \times \left(\frac{1}{T_B} - \frac{1}{T_0}\right)\right\} \tag{8}$$

If the end of the series-connection resistor 3 is connected to the high potential side for the supply voltage, the voltage $V_B$ is expressed by using formula (9).

$$V_B = \frac{R_P}{R_0 \times \exp\left\{B \times \left(\frac{1}{T_B} - \frac{1}{T_0}\right)\right\} + R_P} \times V_0 \tag{9}$$

From formula (9), the certain temperature $T_B$ detected by the NTC thermistor is expressed by using formula (10).

$$T_B = 1 \Big/ \left\{\frac{1}{B} \times \ln\left(\frac{R_P}{R_0} \times \frac{V_0 - V_B}{V_B}\right) + \frac{1}{T_0}\right\} \tag{10}$$

Similarly, if the end of the NTC thermistor is connected to the high potential side for the supply voltage, the voltage $V_B$ is expressed by using formula (11).

$$V_B = \frac{R_0 \times \exp\left\{B \times \left(\frac{1}{T_B} - \frac{1}{T_0}\right)\right\}}{R_0 \times \exp\left\{B \times \left(\frac{1}{T_B} - \frac{1}{T_0}\right)\right\} + R_P} \times V_0 \tag{11}$$

From formula (11), the certain temperature $T_B$ detected by the NTC thermistor is expressed by using formula (12).

$$T_B = 1 \Big/ \left\{\frac{1}{B} \times \ln\left(\frac{R_P}{R_0} \times \frac{V_B}{V_0 - V_B}\right) + \frac{1}{T_0}\right\} \tag{12}$$

Using formula (10) or formula (12), the temperature of the NTC thermistor is calculated in the digital signal processing circuit 6 on the basis of: the reference temperature $T_0$, the reference resistance value $R_0$, and the slope B which are stored in the memory 7; the preset resistance value $R_P$ of the series-connection resistor; the preset supply voltage $V_0$; and the voltage $V_B$ which is a digital voltage signal.

In this configuration, the reference temperature of the NTC thermistor used as the temperature sensor element 1, the reference resistance value which is the resistance value of the NTC thermistor at the reference temperature, and the slope of the change in the resistance value of the NTC thermistor relative to the temperature of the NTC thermistor are stored in the memory 7 as the temperature sensor element data piece. Thus, the temperature of the NTC thermistor can be calculated by using the temperature sensor element data piece. Therefore, the temperature sensor module 100 can measure the temperature of the measurement target medium with high accuracy. In addition, if the NTC thermistor is used as the temperature sensor element 1, one value of each of the reference temperature $T_0$, the reference resistance value $R_0$, and the slope B in the entire range of the voltage at the connection point 9 is stored in the memory 7, and thus the capacity of the memory 7 can be reduced.

<Memory 7>

If a mask ROM is used as the memory 7, content stored in the mask ROM is not rewritable. Therefore, in a process of manufacturing the signal processing circuit 2, if a temperature sensor element 1 to be connected is predetermined, a temperature sensor element data piece about standard center values for a slope and a reference resistance value of the temperature sensor element 1 to be connected, is stored in the memory 7. If mask ROMs are used, temperature sensor element data pieces corresponding to variations of respective temperature sensor elements 1 cannot be stored in the memories 7.

If programmable ROMs are used as memories 7, data pieces can be individually written in the programmable ROMs included in individual signal processing circuits 2, after the signal processing circuits 2 are manufactured. After the resistance values of the individual temperature sensor elements 1 at a certain temperature are measured, the obtained temperature sensor element data pieces can be written in the memories. Therefore, the temperature sensor element data pieces corresponding to the variations of the respective temperature sensor elements 1 are written in the memories 7. In addition, since each temperature sensor element data piece can be changed, a temperature sensor element 1 having a different characteristic can also be connected instead to the signal processing circuit 2. In addition, in the form of the temperature sensor module 100 in which the temperature sensor element 1 and the signal processing circuit 2 are connected to each other, the reference resistance value of the temperature sensor element 1 and the value of the slope are calculated from data obtained in advance by measuring a voltage signal at the connection point 9 between the temperature sensor element 1 and the series-connection resistor 3 when keeping the temperature of the temperature sensor module 100 at a predetermined temperature, whereby a temperature sensor element data piece can be obtained, and the calculated temperature sensor element data piece can be stored in the memory 7.

If the programmable ROMs are used as the memories 7, the temperature sensor element data pieces corresponding to the variations of the respective temperature sensor elements 1 can be stored in the memories 7. Accordingly, the temperature sensor module 100 can measure the temperature of the measurement target medium with higher accuracy.

In addition, as the digital signal processing circuit 6 for calculating the temperature of the temperature sensor element 1 by using the temperature sensor element data piece, the same circuit as the digital signal processing circuit 6 for calculating the resistance value of the series-connection resistor 3 described in the first embodiment can be used. If calculation of the temperature of the temperature sensor element 1 and calculation of the resistance value of the series-connection resistor 3 are performed in the same circuit, the scale of the signal processing circuit 2 can be inhibited from increasing.

As described above, in the temperature sensor module 100 according to the second embodiment, the reference temperature of the temperature sensor element 1, the reference resistance value which is the resistance value of the temperature sensor element 1 at the reference temperature, and the slope of the change in the resistance value of the temperature sensor element 1 relative to the temperature of the temperature sensor element 1 are stored in the memory 7 as the temperature sensor element data piece, and the temperature of the temperature sensor element 1 can be calculated by using the temperature sensor element data piece. Thus, even if temperature sensor elements 1 having various characteristics are used, the temperature sensor module 100 can measure the temperature of the measurement target medium with high accuracy. In addition, if programmable ROMs are used as memories 7, temperature sensor element data pieces of individual temperature sensor elements 1 corresponding to variations of the respective temperature sensor elements 1 can be stored in the memories 7. Accordingly, the temperature sensor module 100 can measure the temperature of the measurement target medium with higher accuracy. In addition, if a platinum resistor is used as the temperature sensor element 1, change in the resistance relative to the temperature of the platinum resistor has low nonlinearity, and one value of each of the reference temperature $T_0$, the reference resistance value $R_0$, and the slope $\alpha$ in the entire range of the voltage at the connection point 9 is stored in the memory 7, and thus the capacity of the memory 7 can be reduced. In addition, if an NTC thermistor is used as the temperature sensor element 1, one value of each of the reference temperature $T_0$, the reference resistance value $R_0$, and the slope B in the entire range of the voltage at the connection point 9 is stored in the memory 7, and thus the capacity of the memory 7 can be reduced. In addition, since calculation of the temperature of the temperature sensor element 1 and calculation of the resistance value of the series-connection resistor 3 can be performed in the same circuit, the scale of the signal processing circuit 2 can be inhibited from increasing.

Third Embodiment

Figure 6:
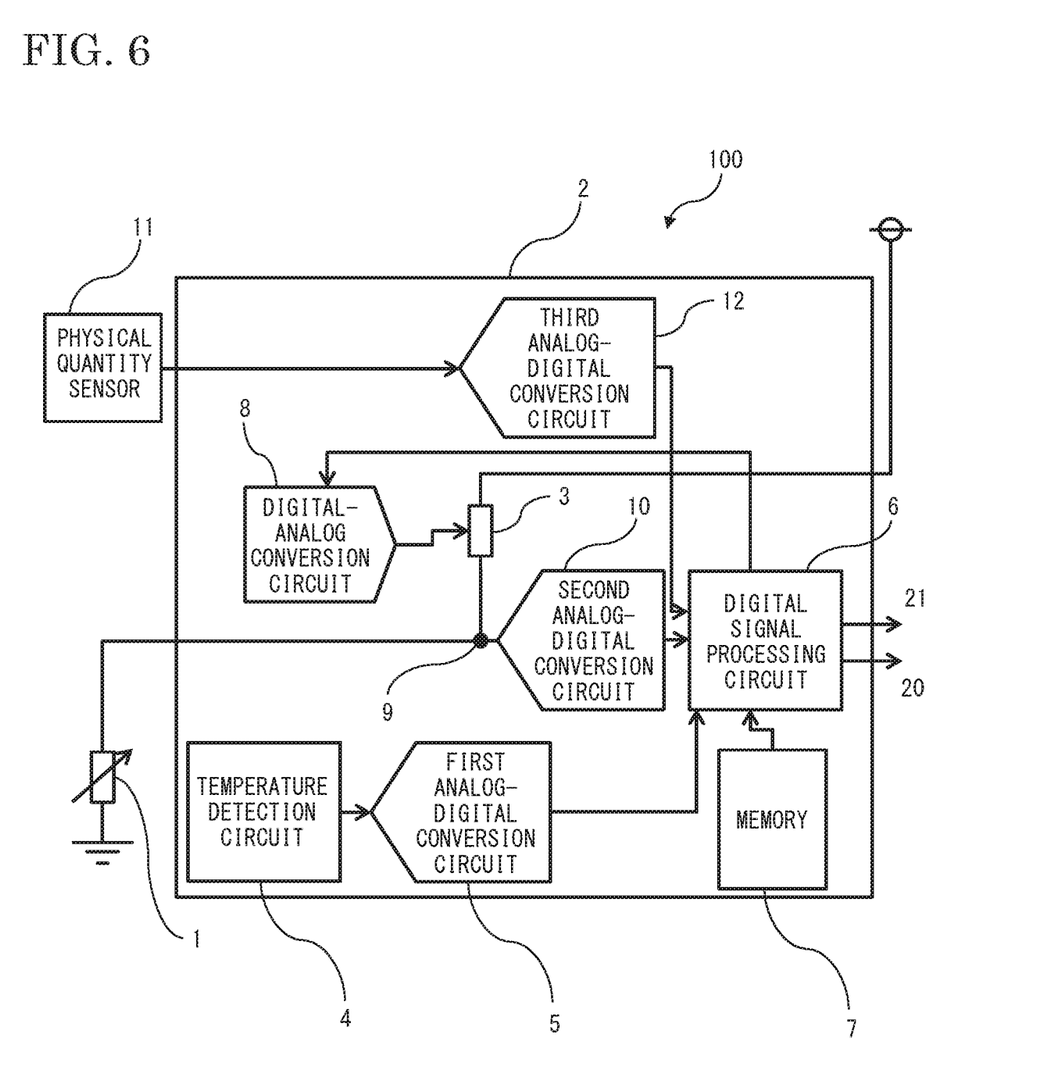
FIG. 6 is a schematic configuration diagram of a temperature sensor module according to a third embodiment.

A temperature sensor module 100 according to a third embodiment will be described. FIG. 6 is a schematic configuration diagram of the temperature sensor module 100 according to the third embodiment. The temperature sensor module 100 according to the third embodiment includes a physical quantity sensor 11, and the signal processing circuit 2 of the temperature sensor module 100 includes a third analog-digital conversion circuit 12.

The temperature sensor module 100 includes, in addition to the components described in the second embodiment, the physical quantity sensor 11 for detecting a specific physical quantity. The type of the physical quantity to be detected by the physical quantity sensor 11 is not particularly limited. The type of the physical quantity is light, pressure, flow rate, magnetism, or the like, and any of them may be used as long as a detected physical quantity can be outputted as an electrical signal. In addition, the number of physical quantity sensors 11 is not limited to one and may be two or more. In addition, the physical quantity sensor 11 may be integrated with the signal processing circuit 2.

The signal processing circuit 2 includes the third analog-digital conversion circuit 12 in addition to the components described in the second embodiment. The third analog-digital conversion circuit 12 converts an output signal from the physical quantity sensor 11 into a digital physical quantity signal, and outputs the digital physical quantity signal to the digital signal processing circuit 6. The memory 7 stores a physical quantity sensor temperature data piece about the relationship between the temperature and the output value of the physical quantity sensor 11. The physical quantity sensor temperature data piece refers to a reference temperature, a reference output value which is an output value of the physical quantity sensor at the reference temperature, and a slope of a change in the output value of the physical quantity sensor relative to the temperature of the physical quantity sensor. The digital signal processing circuit 6 uses the physical quantity sensor temperature data piece stored in the memory 7, to correct the digital physical quantity signal on the basis of the digital signal indicating the temperature of the signal processing circuit 2, and outputs the corrected digital physical quantity signal as a physical quantity sensor signal 21.

If programmable ROMs are used as memories 7, data pieces can be individually written in the programmable ROMs included in individual signal processing circuits 2, after the signal processing circuits 2 are manufactured. After the output values of the individual physical quantity sensors 11 at a certain temperature are measured, the obtained physical quantity sensor temperature data pieces can be written in the memories. Therefore, physical quantity sensor temperature data pieces corresponding to variations of the respective physical quantity sensors 11 are written in the memories 7. In addition, since each physical quantity sensor temperature data piece can be changed, a physical quantity sensor 11 having a different characteristic can also be connected instead to the signal processing circuit 2. In addition, a physical quantity sensor 11 for detecting a different physical quantity can also be connected instead to the signal processing circuit 2.

As the digital signal processing circuit 6 for correcting the output of the physical quantity sensor 11 by using the physical quantity sensor temperature data piece, the same circuit as the digital signal processing circuit 6 for calculating the resistance value of the series-connection resistor 3 described in the first embodiment can be used. If calculation for correcting the output of the physical quantity sensor 11 and calculation of the resistance value of the series-connection resistor 3 are performed in the same circuit, the scale of the signal processing circuit 2 can be inhibited from increasing.

If the physical quantity sensor 11 is disposed close to the signal processing circuit 2, there is substantially no difference in temperature between the physical quantity sensor 11 and the signal processing circuit 2. Therefore, also if the output of the physical quantity sensor 11 is corrected by using information of the temperature detection circuit 4 of the signal processing circuit 2, temperature compensation can be performed for physical quantity detection with high accuracy. In addition, if the physical quantity sensor 11 is integrated with the signal processing circuit 2, there is no difference in temperature between the physical quantity sensor 11 and the signal processing circuit 2. Therefore, temperature compensation can be performed for physical quantity detection with higher accuracy.

As described above, in the temperature sensor module 100 according to the third embodiment, the physical quantity sensor temperature data piece about the physical quantity sensor 11 is stored in the memory 7, and calculation for correcting the output of the physical quantity sensor 11 can be performed by using the physical quantity sensor temperature data piece. Thus, even if physical quantity sensors 11 having various characteristics are used, the temperature sensor module 100 can measure, with high accuracy, the physical quantity detected by the physical quantity sensor 11. In addition, if programmable ROMs are used as memories 7, physical quantity sensor temperature data pieces of individual physical quantity sensors 11 corresponding to variations of the respective physical quantity sensors 11 can be stored in the memories 7. Accordingly, the temperature sensor module 100 can measure, with higher accuracy, the physical quantity detected by the physical quantity sensor 11. In addition, since calculation for correcting the output of the physical quantity sensor 11 and calculation of the resistance value of the series-connection resistor 3 can be performed in the same circuit, the scale of the signal processing circuit 2 can be inhibited from increasing. In addition, the temperature sensor module 100 can include the physical quantity sensor 11 without increasing the scale of the signal processing circuit 2.

Figure 7:
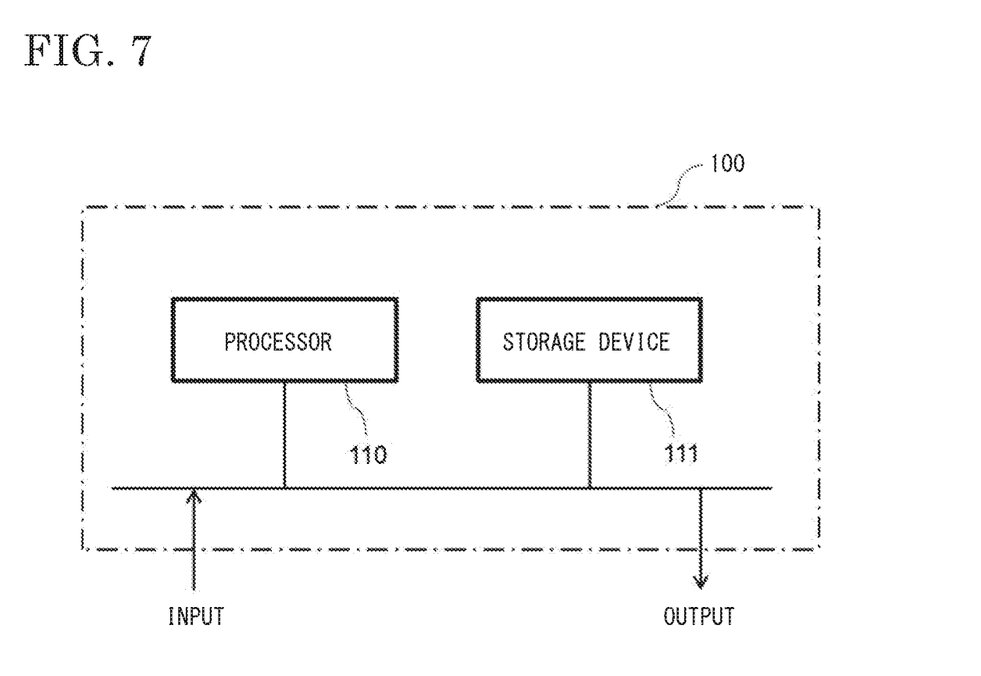
FIG. 7 is a configuration diagram indicating an example of hardware of the temperature sensor module.

As shown in FIG. 7, hardware of the temperature sensor module 100 is composed of, for example, a processor 110 and a storage device 111. Although not shown, the storage device includes a volatile storage device such as a random access memory, and a nonvolatile auxiliary storage device such as a flash memory. Alternatively, the storage device may include, instead of a flash memory, a hard disk as the auxiliary storage device. The processor 110 executes a program inputted from the storage device 111. In this case, the program is inputted from the auxiliary storage device via the volatile storage device to the processor 110. In addition, the processor 110 may output data such as a calculation result to the volatile storage device of the storage device 111, or may save the data to the auxiliary storage device via the volatile storage device.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 temperature sensor element
2 signal processing circuit
3 series-connection resistor
3a resistance element
3b switch element
4 temperature detection circuit
5 first analog-digital conversion circuit
6 digital signal processing circuit
7 memory
8 digital-analog conversion circuit
9 connection point
10 second analog-digital conversion circuit
11 physical quantity sensor
12 third analog-digital conversion circuit
20 temperature sensor signal
21 physical quantity sensor signal
100 temperature sensor module
110 processor
111 storage device

What is claimed is:

1. A temperature sensor module comprising:
   a temperature sensor element of which a resistance value changes according to a temperature of a measurement target medium; and
   a signal processing circuit which is connected to the temperature sensor element and which outputs an electrical signal correlating to the resistance value of the temperature sensor element, wherein
   the signal processing circuit includes
      a series-connection resistor which is connected in series to the temperature sensor element, and of which a resistance value changes according to a command signal having been transmitted,
      a temperature detection circuit which detects and outputs a temperature of the signal processing circuit,
      a first analog-digital conversion circuit which converts an output signal from the temperature detection circuit into a digital signal and outputs the digital signal,
      a memory which stores a series-connection resistor data piece about a relationship between a temperature and the resistance value of the series-connection resistor,
      a digital signal processing circuit which uses the series-connection resistor data piece stored in the memory, to calculate, on the basis of the digital signal indicating the temperature of the signal processing circuit, a digital command signal for keeping the resistance value of the series-connection resistor at a constant value, and outputs the digital command signal, and
      a digital-analog conversion circuit which converts the digital command signal into an analog command signal and outputs the analog command signal to the series-connection resistor.

2. The temperature sensor module according to claim 1, wherein
   the series-connection resistor includes a plurality of resistance elements connected in series, and a plurality of switch elements which establish or break direct connection between both terminals of each of the plurality of resistance elements, and the plurality of switch elements are individually turned on or off by the command signal having been transmitted.

3. The temperature sensor module according to claim 1, wherein the signal processing circuit further includes a second analog-digital conversion circuit which converts, into a digital voltage signal, a voltage signal at a connection point between the temperature sensor element and the series-connection resistor, and which outputs the digital voltage signal, the memory stores a temperature sensor element data piece about a relationship between the resistance value of the temperature sensor element and a temperature of the temperature sensor element, and the digital signal processing circuit uses the temperature sensor element data piece stored in the memory, to calculate a temperature of the temperature sensor element on the basis of the digital voltage signal, and outputs the temperature as the electrical signal.

4. The temperature sensor module according to claim 3, wherein the temperature sensor element is a platinum resistor, and the memory stores, as the temperature sensor element data piece, a reference temperature, a reference resistance value which is a resistance value of the platinum resistor at the reference temperature, and a slope of a change in a resistance value of the platinum resistor relative to a temperature of the platinum resistor.

5. The temperature sensor module according to claim 4, wherein the digital signal processing circuit calculates a temperature $T_A$ of the temperature sensor element by using the following formula:

$T_A = T_0 + 1/\alpha \times \{V_A/(V_0-V_A) \times R_P - R_0\}$, where $T_0$ represents the reference temperature, $R_0$ represents the reference resistance value, $\alpha$ represents the slope, $R_P$ represents the resistance value of the series-connection resistor, $V_0$ represents a supply voltage supplied to the series-connection resistor and the temperature sensor element, and $V_A$ represents the digital voltage signal at the connection point.

6. The temperature sensor module according to claim 3, wherein the temperature sensor element is an NTC thermistor, and the memory stores, as the temperature sensor element data piece, a reference temperature, a reference resistance value which is a resistance value of the NTC thermistor at the reference temperature, and a slope of a change in a resistance value of the NTC thermistor relative to a temperature of the NTC thermistor.

7. The temperature sensor module according to claim 6, wherein the digital signal processing circuit calculates a temperature $T_B$ of the temperature sensor element by using the following formula:

$T_B = 1/[1/B \times \ln\{R_P/R_0 \times (V_0-V_B)/V_B\} + 1/T_0]$, where $T_0$ represents the reference temperature, $R_0$ represents the reference resistance value, $B$ represents the slope, $R_P$ represents the resistance value of the series-connection resistor, $V_0$ represents a supply voltage supplied to the series-connection resistor and the temperature sensor element, and $V_B$ represents the digital voltage signal at the connection point.

8. The temperature sensor module according to claim 1, the temperature sensor module further comprising a physical quantity sensor which detects a specific physical quantity, wherein the signal processing circuit includes a third analog-digital conversion circuit which converts an output signal from the physical quantity sensor into a digital physical quantity signal, and which outputs the digital physical quantity signal, the memory stores a physical quantity sensor temperature data piece about a relationship between a temperature and an output value of the physical quantity sensor, and the digital signal processing circuit uses the physical quantity sensor temperature data piece stored in the memory, to correct the digital physical quantity signal on the basis of the digital signal indicating the temperature of the signal processing circuit, and outputs the corrected digital physical quantity signal.

9. The temperature sensor module according to claim 1, wherein the memory is a programmable ROM.

* * * * *